United States Patent [19]

Terrones et al.

[11] Patent Number: 4,535,796

[45] Date of Patent: Aug. 20, 1985

[54] SEISMIC ACTUATED SHUT-OFF VALVE

[76] Inventors: Johnny Terrones, 13201 Bombay St., Sylmar, Calif. 91342; Walter E. Kennard, 8333 Columbus Ave., Sepulveda, Calif. 91343

[21] Appl. No.: 608,051
[22] PCT Filed: Jun. 28, 1982
[86] PCT No.: PCT/US82/00873
 § 371 Date: Feb. 10, 1984
 § 102(e) Date: Feb. 10, 1984
[87] PCT Pub. No.: WO84/00200
 PCT Pub. Date: Jan. 19, 1984
[51] Int. Cl.³ .............................................. F16K 17/36
[52] U.S. Cl. ..................................... 137/45; 137/68 R
[58] Field of Search .................. 137/38, 39, 45, 46, 137/68 R; 251/66, 74, 335 B

[56] References Cited

U.S. PATENT DOCUMENTS

| | | | |
|---|---|---|---|
| 1,624,736 | 4/1927 | Hutt | 251/335 B X |
| 1,712,498 | 5/1929 | Hawxhurst | 137/38 |
| 2,223,097 | 11/1940 | Ehret | 137/45 X |
| 2,255,965 | 9/1941 | Brandon | 137/45 X |
| 2,325,725 | 8/1943 | Wood | 137/38 |
| 2,637,331 | 5/1953 | Sullivan | 137/39 |
| 3,888,271 | 6/1975 | Pettit | 137/45 |

Primary Examiner—Robert G. Nilson
Attorney, Agent, or Firm—Albert O. Cota

[57] ABSTRACT

A shut-off valve which has a body (20) containing a seat 22 and a through passageway. A plug (32) is attached to a stem (36) which is spring loaded in a retracted position disposed above the valve in a housing 46. A severable link (70) is connected to the end of the stem (36) opposite the plug (32) with an arm (60) further extending the assembly terminating with a weight (68) on top. The arm (60) also contains a ball swivel (64) within a seat (66). Upon receiving external vibratory oscillation, such as a seismic shock wave, the weight (68) rotates axially about the swivel breaking the link (70) allowing the plug (32) attached to the stem (36) to be extended by the spring (58) into the valve seat (22) blocking flow of fluid through the passageway in the valve body.

7 Claims, 6 Drawing Figures

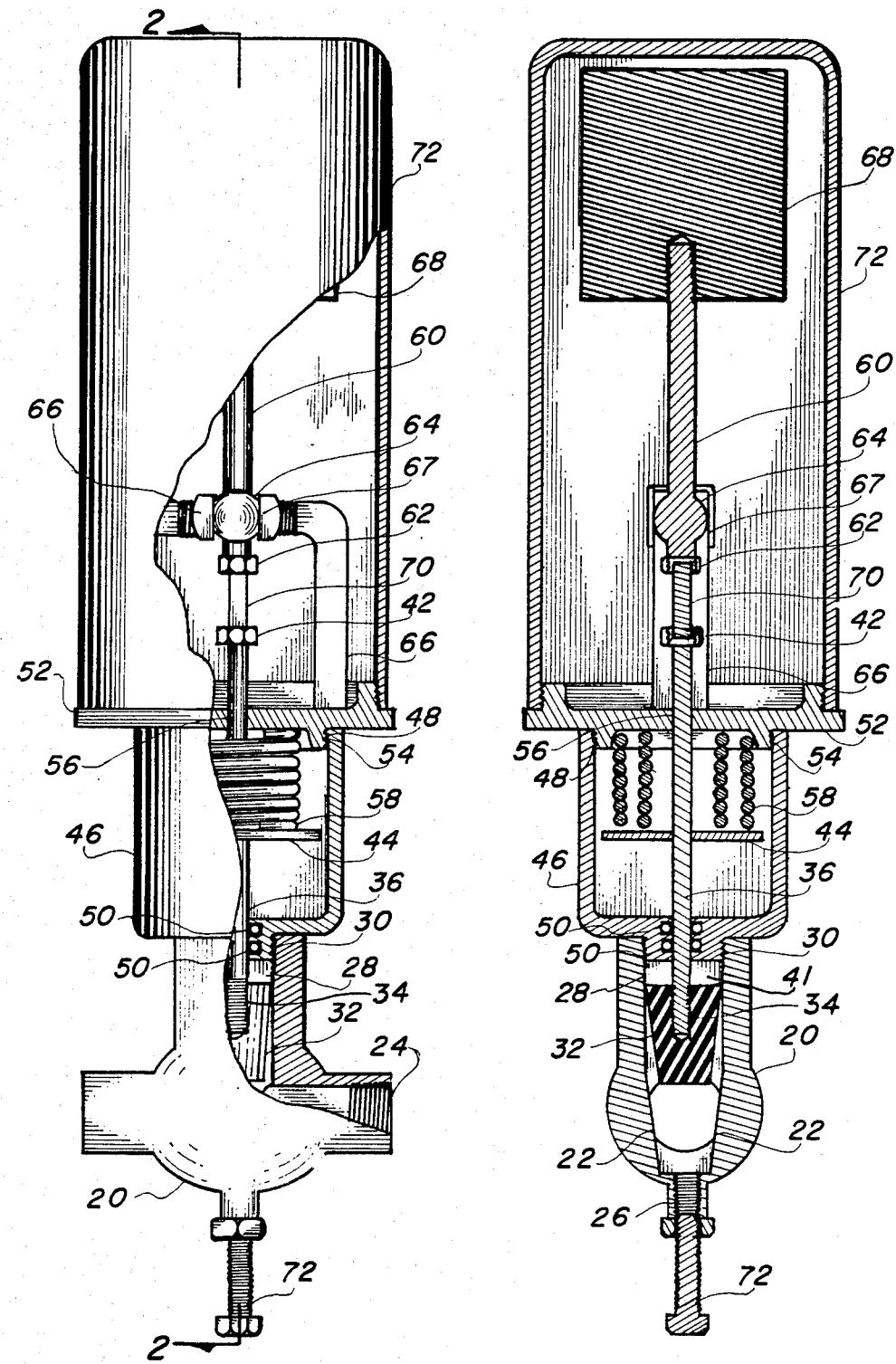

SEISMIC ACTUATED SHUT-OFF VALVE

TECHNICAL FIELD

This invention relates in general to fluid handling control regulated by changing of position or inertia system and more specifically to a fluid shut-off valve actuated by a seismic shock wave fracturing a link, releasing a spring loaded plug into a valve seat.

BACKGROUND ART

Previously, mechanical valves for shutting off fluid flow due to earthquakes have used the principle of falling objects either filling a valve seat or triggering a spring loaded secondary apparatus.

Pazmany in U.S. Pat. No. 4,091,831 teaches such a device with a ball mounted on a pedestal falling and rolling onto a seat when motivated by a seismic shock. U.S. Pat. No. 3,747,616 issued to Lloyd also uses a ball balanced on an inclined bar with a saddle similarly being unseated and falling into the valve inlet orifice, restricting the fluid flow.

A ball is also utilized in U.S. Pat. No. 3,768,497 of Mueller, wherein the ball falls onto a plate attached with a hinge to a closure diaphram shutting off the flow. Yamada in U.S. Pat. No. 3,878,858 teaches a ball on a pedestal falling to a secondary structure, triggering a valve, or the like.

Greer in U.S. Pat. No. 4,116,209 employs a plumb valve body with a groove in a merging corner supported by a rib, which is dislodged by seismic vibrations falling into the port of the valve, effectively blocking the fluid flow. U.S. Pat. No. 3,965,917 of Speck applies a pair of reactant masses moving into an in-line interlocking position, releasing a hinged arm containing a seat disc accomplishing the restriction. Similarly, in U.S. Pat. No. 3,791,396 Nelson exercises a balanced weight falling from a support assembly, triggering a spring loaded mechanism rotating a valve in a pipe line.

In each example of prior art, an object was dislodged from a stationary element, causing a reaction ultimately closing the valve, therefore, the action is dependant upon the mechanical positioning or angular displacement of the member to produce the desired sensitivity to a seismic shock wave.

SUMMARY OF INVENTION

It is well known that the natural phenomenon of an earthquake cannot only destroy man-made structures and endanger human life, but the aftermath of fire may sustain great property loss after the initial seismic vibrations have subsided. As building codes in earthquake prone areas have provided standards to protect the structures, few measures have been legislated to prevent the aftermath of fire.

It is therefore, the primary object of the invention to provide a valve for interrupting the flow of pressurized flammable or explosive fluids into residential, commercial or public structures. This includes natural gas, butane, propane, fuel, oil and the like, in not only public service, but also storage tanks and auxillary facilities. If severe damage were to be inflicted, on any of the above, difficulty may be encountered in not only manually shutting off the flow, but even finding the valve itself, or in the case of fire getting close enough to accomplish the function.

An important object provides a valve that is not only functional in sensing seismic vibrations, but is sensitive to the shock impact of a predetermined magnitude and repeatable within allowable tolerances. This precludes nuisance trips and allows a different sensitivity to be preselected for the area of use such as the general geographical location and if the valve were applied to rural or urban structures. As an example, California uses a magnitude of 0.133 force of gravity as design criteria in earthquake prone areas. As prior art dictates the use of balls or falling objects for actuation, time may change the sensitivity of the setting, such as corrosion build-up on the seat or edge upon which the device rests or electrolysis in dissimilar metals effecting edges and also operating mechanisms. The instant invention eliminates this problem, as a fixed severable link is held in place linearly between a stem and an arm and when subjected to a seismic shock wave a weight cantilevered above the link axially moves within pivot points breaking the link at a predetermined stress. When the link is severed the stem is attached to a plug that is spring loaded positively closing the valve blocking the flow of fluid.

Another object allows the apparatus to be mounted in any position, as normal gravitational influence is not requisite for operation. The valve plug is spring loaded and will be forced into the seat from any axis when the link is broken. This allows the valve to be installed in its preferred vertical position without great sensitivity to its attitude where prior art is not afforded such latitude.

Still another object provides the use of materials not subjected to deterioration and enclosed within a housing that will protect the internal mechanism from damage from falling matter, allowing the device to perform its function even under such adverse environmental conditions.

Yet another object provides a manual opening rod that bypasses the operation of the valve in the case of an accidental triggering of the spring loaded apparatus. This rod is screwed from the bottom of the valve with normal hand tools relocating the plug from the seat to the loaded position compressing the piston spring and allowing normal fluid flow through the valve.

Finally a further object in another embodiment, best illustrated in FIG. 3, includes a manually operated override that may trip the valve by external means, simply moving the weight, in the form of a ball, in any horizontal direction. This may be used in case of a fire or other damage not preceded by an earthquake where it is desirable to shut-off the valve to the structure quickly and without the use of tools. The exposed weight may be moved by hand, foot or in the event of surrounding heat, such as by a fire, may be actuated by a pole or throwing objects breaking the severable link.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is an elevation view of the preferred embodiment partially cut-away to expose the internal components.

FIG. 2 is a cross-sectional view of the preferred embodiment taken along lines 2—2 of FIG. 1.

BEST MODE FOR CARRYING OUT THE INVENTION

Figure 3:
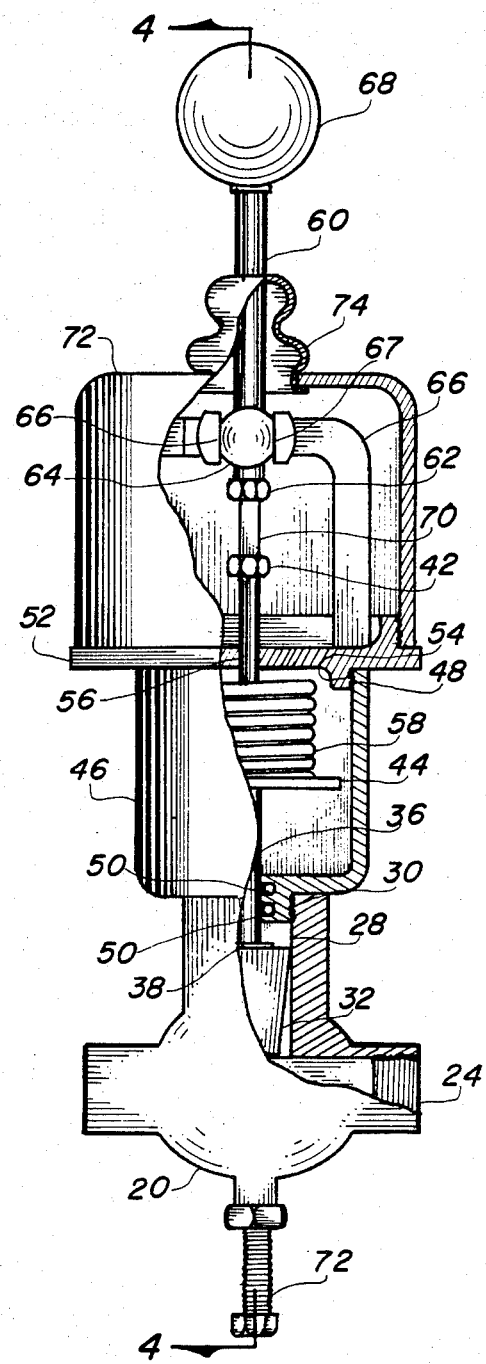
FIG. 3 is an elevation view of another embodiment partially cut-away to expose the internal components.

Referring now more particularly to the referenced characters of the drawing, the invention employs a valve body 20 having an open passageway from one side to the other. The inlet and outlet are identical and the flow of fluid may be from either direction. The body 20 has a minimum flow restriction through the passageway eliminating a pressure drop of the fluid while passing therethrough. The body 20 has a seat 22 located in the center in tapered form encompassing the entire central surface at any one given position. Means to attach the valve body 24 are incorporated in the inlet and outlet and may be any method of attachment convenient to fluid piping such as sweat joint, flare, compression, flange, weld with tapered pipe threads being preferred. A threaded opening 26 is located in the bottom of the body 20 in line with the seat 22 and a bore 28 is incorporated in the opposed position. The bore 28 further contains an internal thread 30 for attachment. The body 20 may be of any material suitable for the application, such as bronze, steel, maleable iron, or the like, having structural integrity and the capability of holding internal pressure. A piston plug 32 is located within the valve body 20 and is free to move slideably within the confines of the walls and the valve seat 22. During operation the plug 32 is positioned within the seat 22 closing-off the passageway blocking the flow of fluid through the valve. The plug 32 is in the form of a truncated cone and has a bore 34 in the center through the entire length. The material of the plug may be of any resilient or solid material, such as rubber, neoprene, nylon, teflon, Buna N, steel, brass, bronze, maleable iron, or the like. Attached through this bore 34 in the plug 32 is a piston stem 36, best illustrated in FIG. 4. This stem is attached to the plug with a ring 38 on the top and a threaded fastener 40 on the bottom. Another embodiment working equally well, shown in FIG. 2, takes advantage of a threaded inset 41 in the plug 32 with the threaded end of the stem 36 attaching directly to the plug eliminating the necessity of ring 38.

The upper end of the piston stem 36 employs a stem link jaw 42 in the form of a collet, or the like, rotatably reducing the size of a cavity disposed within. When the jaw 42 is rotated, fingers are forced with a cone effectively reducing the inside diameter. This element may use any suitable configuration to maintain a cylindrical object in the internal diameter with equal adaptivity. A stem spring flange 44 is attached to the stem 36 distal- Proximate to either end and consists of a flat plate at right angles to the stem in arcuate fashion. This element is permanently attached to the stem 36 by welding, brazing, soldering, or compressingly upsetting the parent metal of the shaft, or the like. This device 44 provides a platform with the surface at right angles to the stem. The valve body 20 has attached at the internal threaded portion 30 a spring housing 46 having an internal chamber defining an axial wall that is open on each end. The lower end interfaces with the threads 30 of the valve body and the upper end is similarly threaded 48 on the interior surface for flange attaching. The housing 46 is hollow and provides protection for apparatus contained within and acts as a spacer. In the lower centrally located portion of the housing 46 is, at least, a pair of stem seals 50 contained within grooves. The seals 50 may be of any configuration, however, "O"-ring type are preferred. The seals 50 tightly surround the stem 36 creating a fluid tight seal restricting the flow of fluid from the valve body 20 to the spring housing 46 while allowing the stem 36 to slide freely in a longitudinal direction.

An inertial weight flange 52 contains threaded attaching means 54 that reversely correspond to the threads 48 of the spring housing 46. This flange 52 further contains a centrally located bore 56 that slideably receives the piston stem 36. When the flange 52 is attached to the housing 46 a chamber is formed containing the stem 36 along with its integral flange 44. A piston spring 58 is disposed compressibly between the stem spring flange 44 and the inertial weight flange 52. This arrangement forces compressibly the separation between the flanges urging the stem 36 in a downward direction into the valve body 20.

An inertial weight arm 60 in dowel shape is ultimately connected to the stem 36 and has attaching means in the form of a threaded fastener on the top end for a weight mass and an arm link jaw 62 on the other end. This link jaw 62 contains a cavity and is similar in all respects to the stem link jaw 42. In close proximity to the jaw 62 is an arm ball swivel 64 that is integral with the arm 6D. This swivel 64 is spherical in shape and allows the arm to swivel freely in an arc within the confines of the apparatus. These confines are defined by an arm stabilizing frame 66 in angular form in duplicate with an opposed pair of elements directed horizontally toward the ball swivel 64 on one end and the inertia weight flange 52 on the other. Each frame 66 is attached on one end to the inertia weight flange 52 and the other to a pair of arm ball seats 67. The seats 67 surround a portion of the ball swivel 64 and allow axial movement to take place. The clearance between the ball 64 and seat 67 is sufficient to allow movement without restriction, but being concave/convex surfaces containment is provided. An inertia weight 68 is connected threadably to the arm 60 at the top end and provides a mass for reactance to external shock and vibration. The weight 6B may be in any convenient shape and material, as only a gravitational force is required for proper operation of the arm.

A severable tension link 70 is located within and held in place by tension of the stem link jaw 42 and the arm link jaw 62. This connection provides a continuation of the arm 60 and the stem 36 being in direct communication, also the spring 54 is in compression holding the plug 32 above the valve seat 22. A manual opening rod 72 is threadably engaged into the threaded opening 26 of the valve body 20 directly beneath the seat 22. An inertia weight housing 72 encompasses the weight 68, arm 60 and associated elements and is threadably engaged into the flange 52. This housing is preferably cylindrical in shape with one open end, however, any convenient shape is acceptable.

In operation, the device is placed into a fluid line, as previously described, with the flow of fluid unrestricted. When subjected to earth vibrations in the form of seismic waves of sufficient magnitude, the inertia weight 68, being free to rotate about a pivot point in the ball swivel 64, creates a lateral force on the severable tension link 70. The link 70 is composed of a substance that is brittle in nature, such as glass, thermoplastic, metal, or the like, that when subjected to this predetermined force shatters or fractures. This action allows the compression spring 58 to release its energy, driving the stem 36 downward with the accompanying plug 32. The plug 32 is then wedged into the valve seat 22, causing a complete restriction to the flow of fluid through the valve 20 passageway. The balance between the force of the vibration and the brittleness of the link 70 determines the material to be selected. Another consideration is its repeatability in its reaction to these forces.

To reset the valve, the manual opening rod 72 is rotated and through the threaded action contacts the bottom of the piston plug 32 or stem 36 pushing it upward against the pressure of the spring 58. This action frees the valve passageway without fluid leakage or the necessity of opening the internal portion of the valve 20. The severable tension link 70 may then be replaced by removing the inertia weight housing 72 exposing the internal structure and rotating the jaws 42 and 62.

Figure 4:
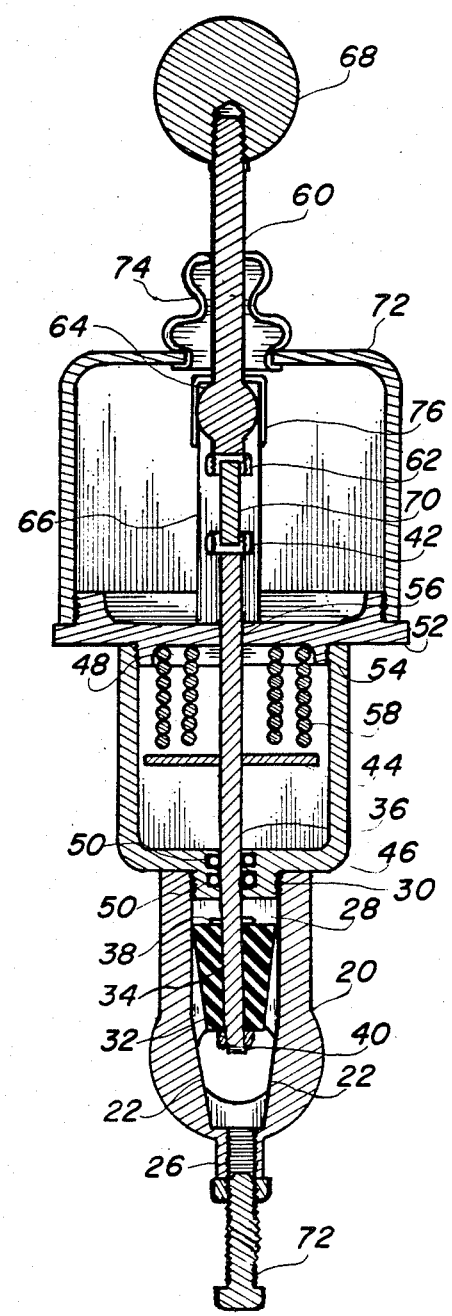
FIG. 4 is a cross-sectional view of another embodiment taken along lines 4—4 of FIG. 3.

In another embodiment, best illustrated in FIGS. 3 and 4, the inertia weight housing 72 applies the use of a resilient boot 74 disposed above and surrounding the arm 60 with the weight 68 being above and outside of the housing 72. The housing 72 is attached in like manner as above and serves the same purpose, except that the weight 68 is exposed above the boot allowing the weight 68 to be manually rotated actuating the mechanism.

Figure 5:
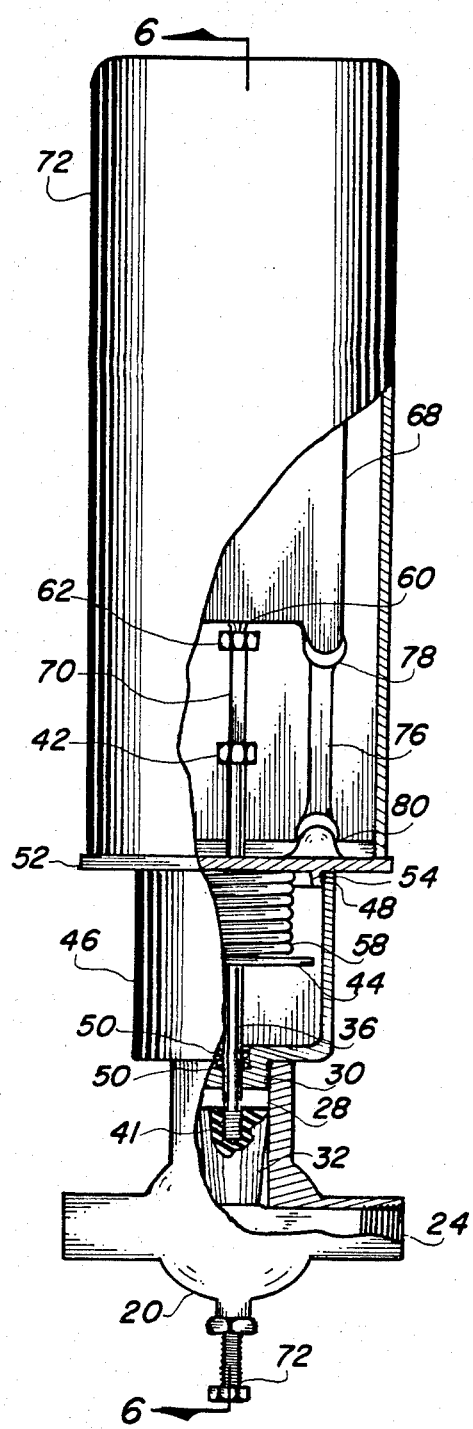
FIG. 5 is an elevation view of yet another embodiment partially cut-away to expose the internal components.
Figure 6:
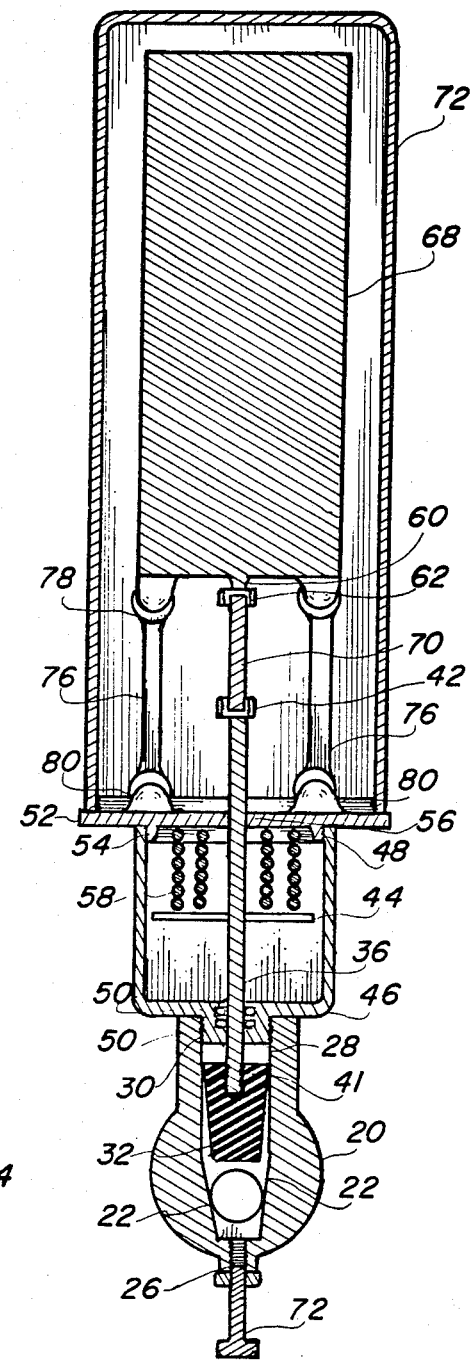
FIG. 6 is a cross-sectional view of yet another embodiment taken along lines 6—6 of FIG. 5.

In another embodiment, pictorially shown in FIGS. 5 and 6, the inertia weight 68, instead of being rotatably attached to the arm 60, is supported by a plurality of pivoted legs 76. The legs 76 are attached to the weight 68 with pivot means 78 similarly the flange 52 contains pivot means 80, both being integral with their corresponding components. This arrangement allows lateral movement of the weight 68 in parallelogram fashion breaking the severable tension link 70 under the directed force of the weight 68 when subjected to vibratory forces.

While the invention has been described in complete detail and pictorially shown in the accompanying drawings, it is not to be limited to such details, since many changes and modifications may be in the invention with departing from the spirit and the scope thereof. Hence, it is described to cover any and all modifications and forms which may come within the language and scope of the appended claims.

We claim:
1. A seismic actuated shut-off valve for fluid flow conduits comprising:
   a. a valve body having an open passageway for passing fluid therethrough having a centrally located plug seat, and a planar threaded opening;
   b. a piston plug positioned within said body slideably maintained in alignment with said plug seat for blocking said passageway to impede the flow of fluid;
   c. a piston stem fixed to said piston plug on the first end for urging said plug linearly into said plug seat maintaining alignment thereof;
   d. a stem link jaw disposed on the second end of said piston stem having a cavity with coarctation when rotated therewith;
   e. a stem spring flange fixed to said piston stem at right angles in arcuate fashion between said piston plug and said stem link jaw providing a platform with the superficies at right angles to said piston stem;
   f. a spring housing having an internal chamber defining an axial wall, open on each end with the first end containing attaching means to embrace said valve body on the exterior and surround said piston stem distal-proximate the interior creating a chamber to enclose said piston stem along with said stem spring flange and the second end having flange attaching means;
   g. a plurality of stem seals contained within said spring housing urgingly embracing said stem and said housing restricting the flow of fluid from said valve body to said spring housing while allowing said stem to slide longitudinally therethrough;
   h. an inertia weight flange containing attaching means to interface with said spring housing on said second open end, with said attaching means, and further containing a centrally located bore slideably receiving said piston stem providing a chamber with said stem extending therethrough;
   j. an inertia weight arm with inertia weight, link jaw and attaching means having a weight mass on the first end and a link jaw cavity on the second end with coarctation when rotated, being affixed pivotally to said inertia weight flange with attaching means extended therefrom, creating a lever arm allowing free movement as interacted with external vibratory or shock wave forces; and,
   k. a severable tension link disposed between and compressibly engaged within said stem link jaw cavity and said inertia weight link jaw cavity defining a continuous member from said piston plug to said piston spring allowing reactance of said inertia weight to axially rotate under the dominance of a seismic shock wave causing the link to structurally yield, fracture and separate, thus permitting said piston spring to expand between said stem spring flange and said inertia weight flange linearly urging said piston plug into said valve body plug seat obstructing the flow of fluid therethrough.

2. The invention, as defined in claim 1, further comprising: a manual opening rod having attachment means on one end with threads integral with the longitudinal surface engaging said valve body threaded opening for urging said plug from said plug seat against the piston spring compression when rotated therewith.

3. The invention, in accordance with claim 1, further comprising: an arm ball swivel integral with said inertia weight arm, spherical in form, contiguous with said inertia weight arm attaching means providing a swivel joint for said arm allowing arcuate movement of the arm within the confines of said attaching means.

4. The inertia weight attaching means of the invention, as recited in claim 1 further comprising: an arm stabilizing frame disposed above said inertia weight flange and affixed thereto having a centrally located arm ball seat for containment of said arm ball swivel being juxtapositioned therewith in intimate fashion.

5. The invention, in accordance with claim 4, further comprising: a weight housing being disposed above and surrounding said inertia weight, attaching means, arm and tension link threadably affixed to said weight flange providing a protective enclosure.

6. The invention. in accordance with claim 4 further comprising: a weight housing with a resilient boot being disposed above and surrounding said inertia weight attaching means, arm and tension link threadably affixed to said weight flange with a portion of said arm protruding through the boot defining a protective enclosure.

7. The inertia weight attaching means of the invention as recited in claim 1, further comprising: a plurality of pivotal legs having clevis means on each end, the first end pivotally attached to said weight and the second end pivotally attached to said flange for lateral movement of said weight in parallelogram fashion together with vertical support of said weight allowing said severable tension link to separate under the lateral force of said weight when subjected to a seismic shock wave.

* * * * *